March 2, 1965     D. J. KENNEDY     3,171,134
SUNSHIELD FOR EYEGLASSES
Filed July 12, 1963
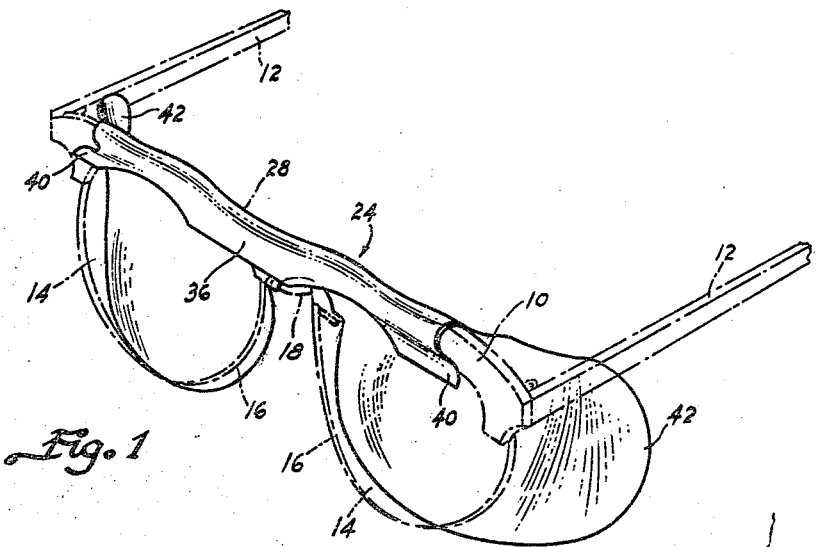
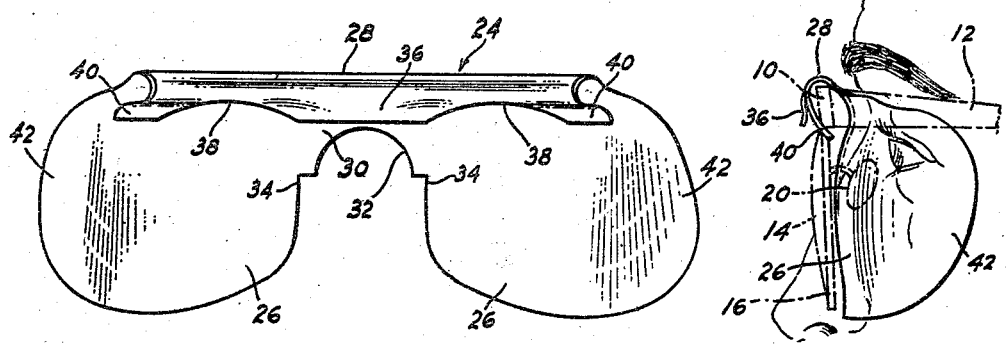
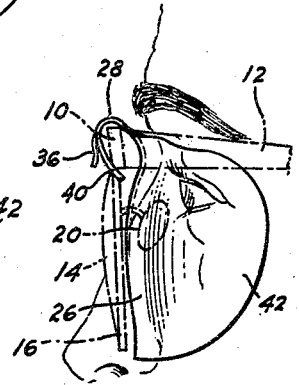
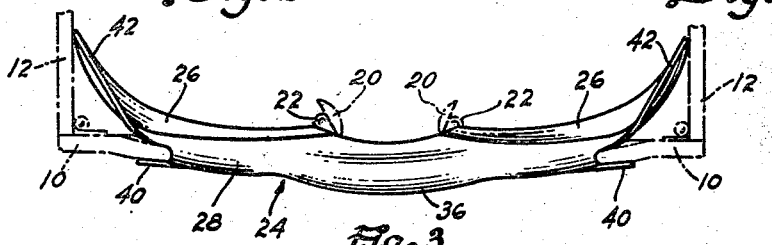
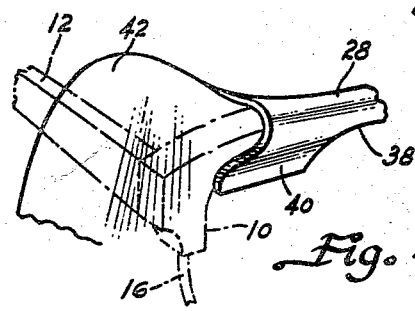
INVENTOR
DAVID J. KENNEDY
BY
ATTORNEY

United States Patent Office

3,171,134
Patented Mar. 2, 1965

3,171,134
SUNSHIELD FOR EYEGLASSES
David J. Kennedy, R.D. 4, York, Pa.
Filed July 12, 1963, Ser. No. 294,646
1 Claim. (Cl. 2—13)

This invention relates to improvements in the construction of a sunshield for eyeglasses and, more particularly, to a unitary type of sunshield which preferably is formed from a sheet of suitably tinted synthetic resin of desirable thickness.

There presently are available on the market various forms of planar sunshields or attachments formed by blanking from a sheet of synthetic resin which is suitably tinted. These are popularly termed "slip-in" type sunshields, the same being intended to be connected to a conventional pair of eyeglasses by being disposed adjacent the inner surfaces of the lenses thereof. Such "slip-in" type sunshields, in order to position the same, are provided with oppositely extending ears or projections at the opposite ends of the lens portions of the sunshields for engagement with the temple bars of the conventional eyeglasses so as to position the sunshield relative thereto.

Various refinements of the above-described "slip-in" type sunshields are available such as various details for receiving the temple bars. Depending however upon the spacing of the arms which support the nose pads on popular type eyeglasses, such available planar type sunshields frequently do not permit acceptable seating of the supporting tongues or projections against the temple bars due to interference of the edges of the lens portions of the sunshields with the arms for the nose pads of the eyeglasses. As a result of this, such improper positioning of the sunshields relative to the eyeglasses prevents maximum effective use of the sunshields, especially due to the fact that they do not extend down in front of the eyes of the wearer as far as they should to provide maximum protection against sun glare. Such ineffectiveness also is enhanced by the fact that such available sunshields are planar and sun glare readily contacts the eyes of the wearer from behind the opposite ends of this type of sunshield.

In addition, the projecting ears at opposite ends of such conventional sunshields for positioning the same relative to eyeglasses by contacting the temple bars of the eyeglasses frequently result in objectionable engagement by articles of apparel such as scarves around the head by feminine users and otherwise.

It is the principal object of the present invention to provide an extremely simple type of sunshield which, preferably, is formed by suitable shaping of a pattern blanked by die stamping or otherwise from a sheet of uniform thickness of appropriately tinted synthetic resin material which is suitably stiff and resilient to maintain the desired shape thereof after having been initially shaped to provide the various elements of construction comprising the present invention, said sunshield comprising a pair of lens-covering portions which are connected at the upper edges thereof by a channel which also is formed by shaping from said blank sheet of material, said channel extending along and receiving the upper portions of the frames of eyeglasses to which the sunshield is to be attached, thereby affording ample strength for the means to connect the lens-covering portions of the sunshield and also provide highly effective means by which the sunshield is attached to and supported by conventional eyeglasses of a very substantial range of different shapes and sizes.

Another object of the invention is to provide latching means on said channel by which to insure against the accidental disconnection of sunshield from the upper frame portions of eyeglasses, said latch means in no way interfering with the vision through the normal lenses of eyeglasses to which the sunshield is connected.

A further object of the invention is to provide an appropriate bowed portion in the forward wall of said channel intermediately of the ends thereof to accommodate the nose bridge of the upper frame portion of eyeglasses and thereby enable the channel of the sunshield to fully receive the major portion of the length of the upper portion of frames of eyeglasses.

Still another object of the invention is to provide the opposite ends of the lens-covering portions of the aforementioned sunshield with curved extensions which not only serve to very effectively prevent the contact of light rays with the eyes of the wearer through the end spaces normally occurring between the face of the wearer and the outer ends of eyeglasses, said curved portions also serving an added function of maintaining the lens-covering portions of the sunshield against curling or other movement from the intended shape of said lens-covering portions, particularly adjacent the lower edges of said portions which are remote from the channel-supporting means at the upper edges of said lens-covering portions.

Details of the foregoing objects and of the invention, as well as other objects thereof, are set forth in the following specification and illustrated in the accompanying drawing comprising a part thereof.

In the drawing:

FIG. 1 is a perspective view of a detachable sunshield embodying the principles of the present invention and illustrated in operative relationship with an exemplary conventional pair of eyeglasses which are illustrated in phantom in said figure, the outer ends of the temple bars thereof being omitted to foreshorten the view.

FIG. 2 is a face view of the sunshield shown in FIG. 1, for purposes of illustrating details of the supporting and attaching means of the sunshield.

FIG. 3 is a top plan view of the sunshield illustrated in FIGS. 1 and 2.

FIG. 4 is a fragmentary view of the upper portion of one end of the sunshield shown in engagement with the upper outer corner at one end of an exemplary pair of eyeglasses to illustrate the details of the latch means embodied in the invention to prevent accidental disconnection of the sunshield from the frame of the eyeglasses to which it is attached.

FIG. 5 is an exemplary end view of the sunshield shown in the preceding figures and illustrated in exemplary manner on the fragmentarily illustrated portion of a human face upon which conventional eyeglasses are illustrated in phantom to show the extent of the area of the human face which is covered by the sunshield of this invention.

Referring to FIG. 1, there is illustrated in phantom a pair of eyeglasses comprising an upper frame portion 10 to the opposite ends of which a pair of temple bars 12 are hingedly connected in accordance with conventional practice. Depending from the upper frame portion 10 are a pair of conventional lenses 14 which either are connected to the frame portion 10 by suitable auxiliary frame bands 16, suitably connected at the ends thereof to the frame portion 10, or otherwise. The upper frame portion 10 also includes a nose bridge 18 and, by reference to FIG. 3, it will be seen that the eyeglass frames also include a pair of nose pads 20 which are supported by nose pad arms 22 below the nose bridge 18.

The sunshield 24 comprising the present invention preferably is formed from a sheet of suitable synthetic resin, appropriately tinted such as dark green, dark gray, dark blue, or otherwise, including various shades of amber, and of suitable thickness so as to be able to maintain the shape which ultimately is imparted to patterns of suitable size and shape which are blanked, such as by die stamping, from such sheets of synthetic resin. Preferably, the material selected for such blanked patterns should be relatively stiff and yet resilient and possessed of limited flexibility for purposes to be described hereinafter. The sunshield 24 basically comprises a pair of lens-shaped portions 26 which, strictly speaking, are only lens-covering portions because in order to comprise a true lens, they should have optical magnifying or demagnifying powers. The portions 26 are connected by a channel 28 comprising opposed walls, one of which is actually a continuation of the upper portions of the lens-covering portions 26, including what might be termed a nose-bridge portion 30 defined by a curved edge 32 which is of ample size to conform to a human nose but preferably not engage the same.

The innermost edges of the lens-covering portions 26 also are provided with clearance notches 34 which are refinements to accommodate the nose pad arms 22 of eyeglasses upon which the sunshield is to be mounted. Such clearance notches insure complete seating of the channel 28 upon the upper frame portion 10 of the eyeglasses.

The channel 28 also comprises a forward wall 36 and adjacent the opposite ends thereof, the lower edge of said wall preferably is provided with somewhat widely curved edges 38 which serve the dual purpose of minimizing obstruction of the forward wall 36 of the channel with vision of the wearer and also to lend flexibility to the flexible latching tabs 40 projecting from opposite ends of the forward wall 36. The latching tabs 40 preferably extend inward toward the opposite wall of the channel 28, whereby when the sunshield 24 is connected to the eyeglasses by the channel 28 being disposed over the upper frame portion 10 of the eyeglasses with the lens-covering portions 26 disposed immediately to the rear of the lenses 14 of the eyeglasses, the latching tabs 40 will, as best shown in FIG. 5, extend against the lower forward surfaces of the upper frame portion 10 and, under some circumstances, depending upon the width of the frame portion 10, the tabs 40 may even engage a slight amount of the upper portion of the lenses 14 of the eyeglasses but effective, though readily disconnectable latching of the sunshield to the eyeglasses is achieved.

The forward wall 36 of the channel, intermediately of the ends thereof, is provided with an outward bulge to accommodate the nose bridge 18 in the upper portion of the frame 10 of the eyeglasses without interfering with the complete seating of the channel 28 upon the upper frame portion 10.

The outer ends 42 of the lens-covering portions 26 are curved rearwardly through a gradual arc to provide a "wrap-around" effect, particularly to obstruct the passage of sun rays and glare into the eyes of the wearer from opposite ends of the eyeglasses. Such curved outer ends also stiffen the lens-covering portions 26 against curling or deflection, particularly of the lower portion of the lens-covering areas of the sunshield which are remote from the supporting channel at the upper portion of the sunshield.

Further, from FIG. 5 especially, it will be seen that the lens-covering portions 26 are concavo-convex, at least to a limited extent, to conform generally to the concavity of normal eyeglass lenses, and also to minimize the rubbing of eyelashes against the inner surfaces of portions 26. Such concavo-convex shape is accomplished easily while the sheet material is softened for purposes of otherwise shaping the die-cut blanks into the finished product.

While the invention has been described and illustrated in its several preferred embodiments, it should be understood that the invention is not to be limited to the precise details herein illustrated and described since the same may be carried out in other ways falling within the scope of the invention as claimed.

I claim:

A detachable sunshield for conventional eyeglasses having frames comprising a sheet of suitably tinted synthetic resin shaped to provide a pair of lens-covering portions connected by a downwardly and forwardly opening channel extending transversely between and along the upper edge portions of said lens-covering portions, said lens-covering portions thereby being positionable adjacent the inner surfaces of the lenses of conventional eyeglasses and the channel of said sunshield adapted to extend along and receive the upper portions of the frames of said eyeglasses, the channel having a short forward wall adapted to overlie the forward surface of the upper frame portion of said eyeglasses to retain said sunshield positioned operatively upon said eyeglasses and the outer ends of said lens-covering portions being permanently and substantially curved rearwardly through a gradual arc of such a length as to shield the eyes of a wearer, said curved ends being integral with and supported solely by said lens-covering portions and also serving to maintain the lens-covering portions against curling from the vertical plane thereof to preserve the intended shape thereof relative to the supporting channel at the edges of said portions.

References Cited by the Examiner

UNITED STATES PATENTS

| | | | |
|---|---|---|---|
| 1,310,077 | 7/19 | Heaford | 2—13 X |
| 1,794,927 | 3/31 | Smith et al. | 2—13 |
| 1,805,396 | 5/31 | Havens | 2—13 X |
| 2,413,193 | 12/46 | Robblee | 2—13 |
| 2,949,609 | 8/60 | Sager | 2—13 |
| 3,023,418 | 3/62 | Hammond | 2—13 |

JORDAN FRANKLIN, *Primary Examiner.*

ROBERT V. SLOAN, *Examiner.*